United States Patent [19]

Kucenty

[11] 4,130,131
[45] Dec. 19, 1978

[54] COMPRESSOR VALVE

[76] Inventor: Jerzy Kucenty, 49 Edgebrook Cres., Bramalea, Ontario, Canada

[21] Appl. No.: 693,105

[22] Filed: Jun. 4, 1976

[51] Int. Cl.$^2$ ............................................. F16K 15/02
[52] U.S. Cl. .................................. 137/512.1; 251/337; 137/516.11
[58] Field of Search ........... 137/512.1, 516.11, 516.13, 137/516.15; 417/563, 569; 251/337

[56] References Cited

U.S. PATENT DOCUMENTS

| 1,668,865 | 5/1928 | Nelson | 137/512.1 |
|---|---|---|---|
| 1,768,840 | 7/1930 | Holdsworth | 137/516.11 |
| 1,957,867 | 5/1934 | Rike | 137/516.11 |
| 3,489,334 | 1/1970 | Garland | 417/569 |
| 3,556,136 | 1/1971 | White | 137/512.1 |

FOREIGN PATENT DOCUMENTS

| 1098867 | 3/1955 | France | 137/512.1 |
|---|---|---|---|
| 858883 | 1/1961 | United Kingdom | 137/512.1 |

Primary Examiner—William R. Cline

[57] ABSTRACT

A valve closure replacement kit for a compressor valve of the type having a valve plate, and a plurality of linear slotted openings in such valve plate for passage of air or gas therethrough and a valve head located above said valve plate in spaced relation, said closure replacement kit being characterized by an integral one-piece valve closure member, said closure member having a plurality of slots formed therein, defining therebetween a plurality of valve closure bars, said slots being located out of registration with the slotted openings in the valve plate, and locating the valve bars in registration with such slotted openings in the valve plate, and said one-piece valve closure member defining at least one valve closure guide surface, at least one complementary valve guide member for attachment on said valve plate, and, an integral one-piece spring member having slotted opening means therein in registration with said slotted openings in said one-piece valve closure member, thereby defining spring arm portions between said openings registering with said bar portions of said one-piece valve closure member, and pressurizing same into engagement with said valve plate.

5 Claims, 3 Drawing Figures

COMPRESSOR VALVE

The present invention relates to a compressor valve such as is used in compressors for air and gases.

In order to ensure reliable trouble-free operation, compressor valves require regularly scheduled maintenance, and replacement of moving parts. The cost of manufacture of the replacement parts is a significant factor in the cost and the labour cost of maintenance is relatively high.

Conventional compressor valves, have, in the past incorporated a relatively large number of separate replaceable, wearing parts which has resulted in additional labour and time during the regular maintenance and replacement of parts. There are two principal types of compressor valves in use today. The first type of compressor valve may be called the linear valve. In this type of valve a valve plate is provided with a series of parallel spaced apart linear slotted openings through which the air and gases pass. A plurality of separate linear valve closure members are arranged in registration with such openings. Any suitable spring means will hold the closure members over the slotted openings. The other type of compressor valve may be called the annular valve.

A typical annular compressor valve is shown in United States Pat. No. 3,536,094 granted to F. E. Manley. In that type of compressor valve, a valve plate or disc is provided with a plurality of slotted openings. A plurality of separate annular valve closure members are located in registration with respective slotted openings and are held in engagement by any suitable spring means.

The present invention is principally concerned with the provision of a kit of replacement parts, for the servicing of the linear type of compressor valve in a simplified expeditious manner, and is adaptable to a wide range of different sizes and types of such linear compressor valves.

It has been the usual practice to provide a valve head located above the plate, having a series of separate guide members for guiding the valve closures as they lift upwardly and downwardly off the valve plate to open and close the slotted openings. In addition, separate spring means were provided for each of such valve closure members. Servicing of such a valve with numerous separate parts presented problems, and the manufacture and supplying of the individual parts also involved additional expense. In addition, the machining of the valve head with the various separate guide members was a relatively time consuming and costly operation, and any wear in the valve head required replacement of the entire unit.

It is clearly advantageous to reduce the number of separate working parts, for ease of servicing, and also to improve the design of the valve head and the guide members to avoid the expensive procedures outlined above.

BRIEF SUMMARY OF THE INVENTION

The invention therefore seeks to provide a valve closure replacement kit for a compressor valve of the type having a valve plate, and a plurality of slotted openings in such a valve plate for the passage of air or gas therethrough and a valve head located above said valve plate in spaced relation, said closure replacement kit being characterized by an integral one piece valve closure member, said closure member having a plurality of slots formed therein, defining therebetween a plurality of valve closure bars, said slots being located out of registration with the slotted openings in the valve plate, and locating the valve bars in registration with such slotted openings, and said one piece valve closure member defining at least one valve closure guide surface, at least one complementary valve guide member for attachment on said valve plate and an integral one piece spring member having slotted opening means therein in registration with said slotted openings in said one piece valve closure member, thereby defining spring arm portions between said openings registering with said bar portions of said one piece valve closure member, and pressurizing same into engagement with said valve plate.

More particularly, it is an objective of the invention to provide a compressor valve having the foregoing advantages in which the guide means on said valve plate are releaseably detachable therefrom for replacement purposes.

More particularly, it is an objective of the invention to provide a compressor valve having the foregoing advantages and in which the slotted openings in the valve plate and head, and in the one piece valve closure member and in the spring member are all arranged in a linear fashion parallel with one another.

More particularly, it is an objective of the invention to provide a compressor valve having the foregoing advantages and in which guide surfaces are provided in spaced apart parallel relation on opposite sides of said one piece valve closure member, and in which said valve guide means on said valve plate comprise a pair of guide blocks, releaseably attachable on opposite sides of said valve plate.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

DESCRIPTION OF A SPECIFIC EMBODIMENT

Figure 1:
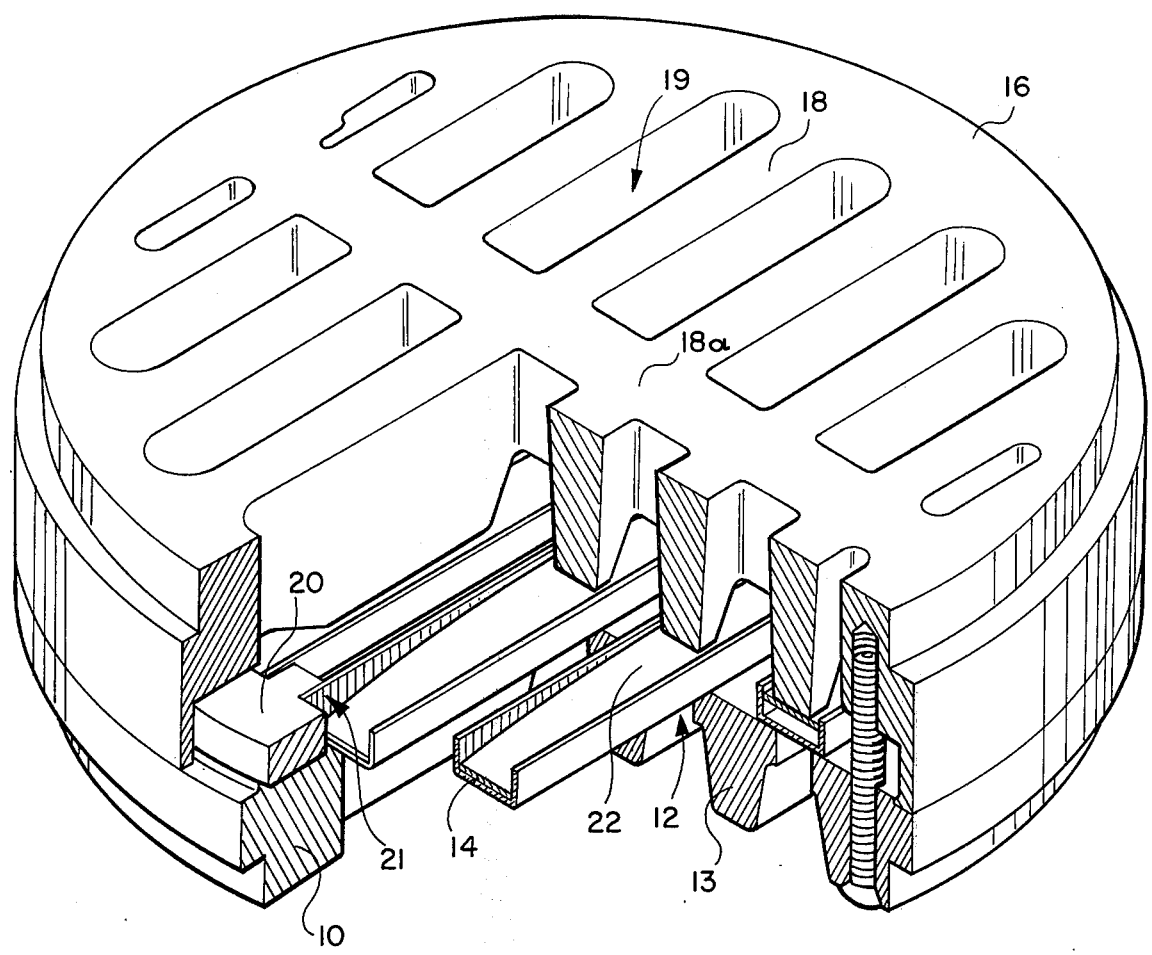
FIG. 1 is a cut-away perspective illustration of a compressor valve of a type used in the prior art, and is labelled prior art.

Referring first of all to FIG. 1, showing a typical prior art compressor valve, it will be seen that such a valve conventionally comprise a valve plate 10, having a plurality of slotted openings 12 defined by bars 13 for passage of air or gas therethrough. Above the slotted openings 12 were located a plurality of separate individual valve closure members 14. The closure members were of generally channel shape in cross-section.

Above the valve closure members 14 was located a valve head 16. The head 16 was attached around the edge of the valve plate 10 by threading, or by bolts or the like in a variety of different ways. The valve head 16 was provided with a plurality of bars 18 extending in registration with the slotted openings 12 in the plate 10. In this way the bars 18 were located directly above the valve closure members 14. The bars define openings 19 therebetween. Transverse reinforcing bars 13a and 18a connect the bars 13 and 18 respectively.

At each end of the closure members 14, guide members 20 having recesses 21 were provided, in which each end of each of the individual valve closure members 14 would move upwardly and downwardly.

Any suitable spring means such as 22 was located in each of the channels 14 to urge them normally into engagement with the plate 10, thereby covering the holes 12.

It will thus be seen that as the closure members 14 moved upwardly and downwardly in use, they would wear at either end, also causing wear on the guide members 20.

When such a valve was serviced, it was necessary in many cases to replace the closure members 14 and also the guide members 20 if the guide recesses became worn. In addition, it was necessary to manufacture the closure members 14 in different lengths to accommodate different lengths of slotted openings 12, it being borne in mind that such compressor valves are normally circular in plan.

Figure 2:
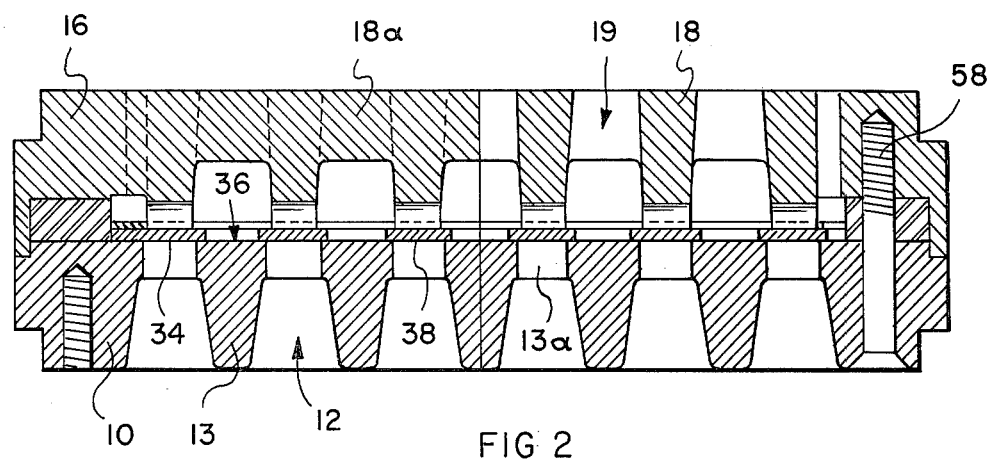
FIG. 2 is a section through a compressor valve showing the closure replacement kit in accordance with the invention.
Figure 3:
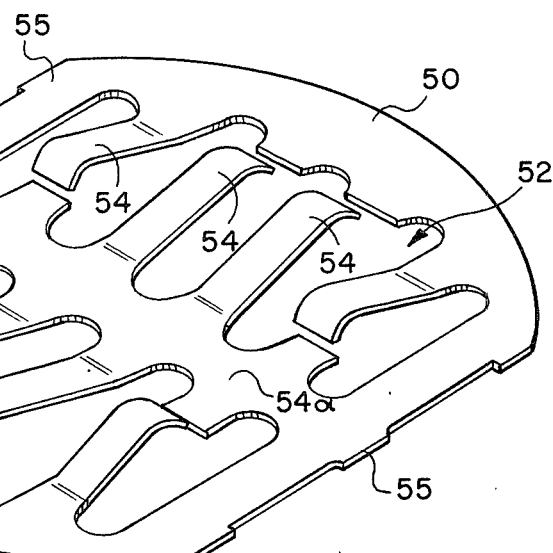
FIG. 3 is an enlarged exploded view showing the valve closure member, spring means and guide members.
Figure 3:
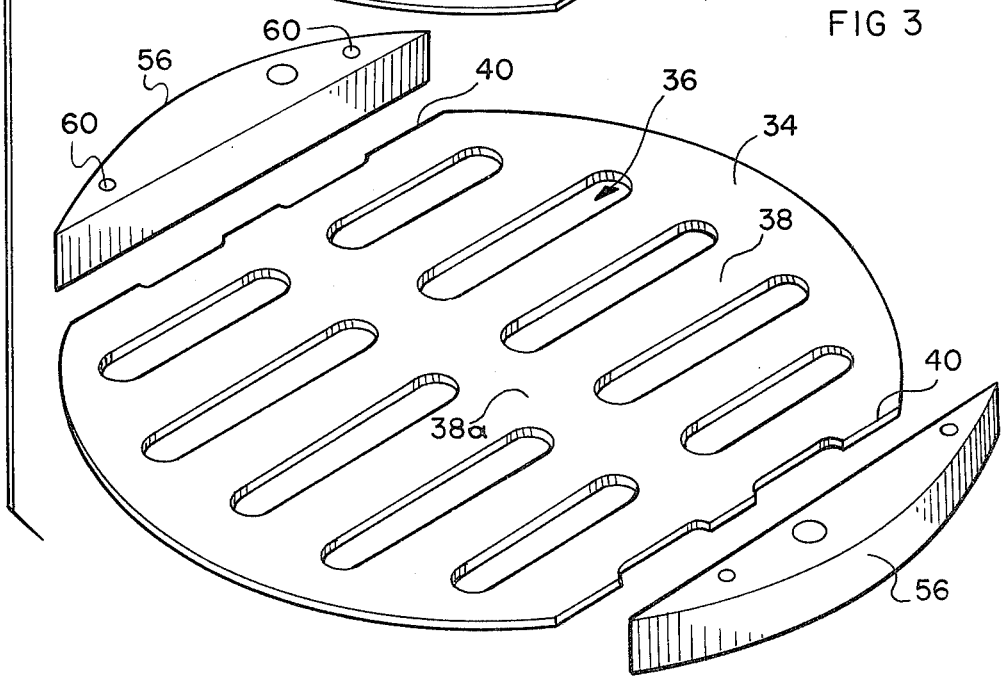

Referring now to FIGS. 2 and 3, it will be seen that the invention provides a closure replacement kit for such a compressor valve and which comprises an integral one piece valve closure member 34, cut out of a single sheet of material. The material may be metal or thermoplastic or the like. A plurality of slotted openings 36 are cut through the closure member 34 thereby defining a plurality of closure bars 38. The closure bars 38 are arranged to register with the slotted openings 12 in the plate 10. In this way air or gas can pass through the slotted openings 12 and then through the slotted openings 36 in the closure member 34.

On opposite sides of the closure member 34, guide surfaces 40 are provided for purposes to be described below.

Above the closure member 34 is located the valve head 16. The valve head 16 is attached in position spaced above the plate 30 by means of a bolt or bolts. However other attachment means may be used if desired in a manner known per se.

The valve head 16 is provided with slotted openings 19 therethrough between bars 18 registering with the closure bars 38 of the closure member 34.

Between the valve head 16 and the closure member 34, there is provided a single integral one piece spring biasing means The spring biasing means comprises a generally disc-shaped member 50 having a plurality of slotted openings 52. is cut out with openings 52 registering with the slotted openings 36 in the closure member 34. Such slotted openings 52 in the spring biasing means 50 define between them a plurality of spring finger-like members 54, which are bent upwardly into engagement with the valve head bars 18. In this way the remainder of the spring biasing means 50 is pressed downwardly into engagement with the closure member 34 thereby holding the same in position against the valve plate 10. Spring member 50 also has linear guide edges 55 for controlling its position.

In both the closure member 34 and the spring member 50, there are transverse junction portions 38a and 54a respectively for joining bars 38 and fingers 54 to provide a unitary one piece construction.

In order to guide the upward and downward movement of the closure member 30, a pair of generally arcuate segment guide portions 56 are attached on top of the valve plate 10, by for example screws or the like as shown. Such guide portions are removable and replaceable if they become worn. They engage the guide surfaces 40 on either side of the closure member 34, so that the same is held in the correct orientation and does not rotate relative to the plate 10.

The attachment of the guide segments 56 may be carried out simply, by drilling two suitable holes in the top side of the valve plate 10, and tapping them so as to receive suitable attachment screws as shown.

However, other forms of attachment may be used if desired. For example, in the invention as shown only one such screw is used for the attachment of each segment portion. However the segment portion is maintained in alignment, by the use of an additional aligning pins, the screws and pins being shown respectively as 58 and 60.

Servicing of the valve according to the invention is a simple matter. All that has to be done is to release the valve head, and remove the spring biasing means and the closure member and replace them with a new closure member and biasing means. If the guide members have become worn, these are simply removed and replaced. The whole operation can be carried out in a minimum of time without the requirement for any skilled help. The problem of manufacturing a number of working parts is greatly reduced.

It will of course be appreciated that while the invention has been described in association with a compressor valve having linear valve openings, the invention is equally well applicable to a compressor valve having annular valve openings as shown in U.S. Pat. No. 3,536,094. Obviously, in this case the one piece closure member would be provided with annular openings which were discontinuous so that the valve closure bars remained united to one another at spaced intervals around the closure member. The same arrangement would also be required in connection with the valve head, and in connection with the spring biasing means.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A plate-type valve which comprises:
  a valve body having a plurality of mutually parallel and spaced apart elongated openings therethrough for the flow of fluid;
  a valve head located above said valve body in spaced apart position relative thereto to define therewith a valve chamber, at least one discharge opening being provided for the flow of fluid out of said valve chamber;
  a peripheral wall disposed between said valve body and said valve head outwardly to define said valve chamber; two separate and removable wall portions having opposed mutually parallel and linear guiding surfaces mounted in said chamber;
  an integral one-piece valve closure plate disposed within said valve chamber and having opposed linear end edges and a plurality of mutually parallel and elongated openings therethrough generally parallel to said linear end edges thereof for the flow of fluid and imperforate portions located in registration with said openings in said valve body to close those openings when said valve closure plate is disposed in a closed position in sealing proximity to said valve body, movement of said valve closure plate being guided solely by said peripheral wall with said linear end edges thereof guidedly engaging respective ones of said linear guiding surfaces of said removable wall portions; and a resilient one-piece spring means disposed within said valve chamber between said valve head and said valve closure plate and comprising a generally planar spine having terminal end surfaces for guided engagement with respective ones of said linear guiding surfaces of said removable wall portions, generally planar end members integrally formed with said spine, essentially coplanar therewith and extending generally perpendicularly thereto at each end thereof and in both directions therefrom, generally planar side members integrally formed with respective ones of said end members on opposite sides of said spine, essentially coplanar with said spine, extending generally parallel thereto and having terminal end guide surfaces essentially co-linear with respective ones of said terminal end surfaces of said spine for guided engagement with respective ones of said linear guiding surfaces of said removable wall portions, a plurality of resiliently flexible fingers integrally formed with said spine, extending generally perpendicularly from said spine angularly with respect to the principal plane of said spine on both sides of said spine toward respective ones of said side members and terminating outwardly of said spine but inwardly of respective ones of said side members, and a plurality of resiliently flexible fingers integrally formed with said side members, extending generally perpendicularly therefrom toward said spine and terminating outwardly of said spine, all said fingers terminating at positions which are offset from the principal plane of said spine so as to act between said valve head and said valve closure plate to urge said plate into said closed position thereof.

2. A plate-type valve as claimed in claim 1 and in which said spine of said spring means is in surface abutment with said valve closure plate while said fingers generally terminally engage said valve head.

3. A plate-type valve as claimed in claim 1 and in which said resiliently flexible fingers integrally formed with said side members of said spring means and extending toward said spine therefrom terminate nearer said spine than do said resiliently flexible fingers integrally formed with said spine of said spring means and extending toward respective ones of said side members thereof.

4. A one-piece spring means for use in a plate-type valve and which comprises:

a generally planar spine having terminal end guide surfaces;

generally planar end members integrally formed with said spine, essentially coplanar therewith and extending generally perpendicularly thereto at each end thereof and in both directions therefrom;

generally planar side members integrally formed with respective ones of said end members on opposite sides of said spine, essentially coplanar with said spine, extending generally parallel thereto and having terminal end guide surfaces essentially co-linear with respective ones of said end guide surfaces of said spine;

a plurality of resiliently flexible fingers integrally formed with said spine, extending generally perpendicularly from said spine on both sides thereof toward respective ones of said side members and terminating outwardly of said spine but inwardly of respective ones of said side members; and a plurality of resiliently flexible fingers integrally formed with said side members, extending generally perpendicularly therefrom toward said spine and terminating outwardly of said spine, all of said fingers terminating at positions which are offset from the principal plane of said spine.

5. A spring means as claimed in claim 4 and in which said resiliently flexible fingers integrally formed with said side members and extending toward said spine therefrom terminate nearer said spine than do said resiliently flexible fingers integrally formed with said spine and extending toward respective ones of said side members.

* * * * *